(12) United States Patent
Tione et al.

(10) Patent No.: US 10,486,672 B2
(45) Date of Patent: Nov. 26, 2019

(54) PNEUMATIC BRAKING SYSTEM FOR A RAILWAY VEHICLE WITH A SOLENOID BRAKE RELEASE VALVE

(71) Applicant: FAIVELEY TRANSPORT ITALIA S.P.A., Piossasco (Turin) (IT)

(72) Inventors: Roberto Tione, Lauriano (IT); Andrea Cavazzin, Milan (IT)

(73) Assignee: FAIVELEY TRANSPORT ITALIA S.P.A., Piossasco (Turin) (IT)

( * ) Notice: Subject to any disclaimer, the term of this patent is extended or adjusted under 35 U.S.C. 154(b) by 0 days.

(21) Appl. No.: 15/746,260

(22) PCT Filed: Jul. 21, 2016

(86) PCT No.: PCT/IB2016/054331
§ 371 (c)(1),
(2) Date: Jan. 19, 2018

(87) PCT Pub. No.: WO2017/013610
PCT Pub. Date: Jan. 26, 2017

(65) Prior Publication Data
US 2018/0215365 A1    Aug. 2, 2018

(30) Foreign Application Priority Data

Jul. 22, 2015 (IT) .................. 102015000036973

(51) Int. Cl.
*B60T 13/68* (2006.01)
*B60T 15/02* (2006.01)
*B60T 17/22* (2006.01)

(52) U.S. Cl.
CPC .......... *B60T 13/683* (2013.01); *B60T 15/021* (2013.01); *B60T 15/027* (2013.01); *B60T 17/228* (2013.01); *B60T 2270/40* (2013.01)

(58) Field of Classification Search
CPC .... B60T 13/683; B60T 15/021; B60T 15/027; B60T 17/228; B60T 2270/40
(Continued)

(56) References Cited

U.S. PATENT DOCUMENTS 4,679,863 A * 7/1987 Ikeda .................... B60T 13/665
 188/158
5,222,788 A * 6/1993 Dimsa ................... B60T 13/665
 303/15
(Continued)

FOREIGN PATENT DOCUMENTS

DE     10135797 A1   2/2003
EP      0855319 A2   7/1998

*Primary Examiner* — Robert A. Siconolfi
*Assistant Examiner* — San M Aung
(74) *Attorney, Agent, or Firm* — Arent Fox LLP; Michael Fainberg

(57) ABSTRACT

The pneumatic braking system comprises a pneumatic circuit for supplying a pneumatic braking pressure to at least one brake cylinder, and includes a pneumatic solenoid charging valve and a pneumatic solenoid discharge valve adapted to cause an increase and a reduction, respectively, of the pneumatic pressure acting upon the at least one brake cylinder, the solenoid valves being controlled by an electronic braking control unit; a solenoid brake release valve adapted to cause, when energized, a complete discharge of the pneumatic pressure applied to the at least one brake cylinder, independently of the conditions of the solenoid charging and discharge valves; and an electric emergency line on which in normal operation there is a voltage which drops when emergency braking is activated.

3 Claims, 2 Drawing Sheets

(58) Field of Classification Search
USPC .............................................. 303/15, 3, 7, 9
See application file for complete search history.

(56) References Cited

U.S. PATENT DOCUMENTS

| | | | | |
|---|---|---|---|---|
| 5,332,297 A | * | 7/1994 | Cunkelman | B60T 13/665 |
| | | | | 303/15 |
| 6,286,913 B1 | | 9/2001 | Mazur et al. | |
| 2004/0119331 A1 | * | 6/2004 | Long | B60T 13/665 |
| | | | | 303/3 |
| 2015/0307071 A1 | * | 10/2015 | Bradley | B60T 13/266 |
| | | | | 303/20 |
| 2016/0082939 A1 | * | 3/2016 | Cole | B60T 13/665 |
| | | | | 303/8 |

* cited by examiner

PNEUMATIC BRAKING SYSTEM FOR A RAILWAY VEHICLE WITH A SOLENOID BRAKE RELEASE VALVE

The present invention relates in a general way to a pneumatic braking system for a railway vehicle.

More specifically, the invention proposes a pneumatic braking system of the type comprising a pneumatic circuit for supplying a pneumatic braking pressure to at least one brake cylinder, including a pneumatic solenoid charging valve and a pneumatic solenoid discharge valve adapted to cause an increase and a reduction, respectively, of the pneumatic pressure acting upon said at least one brake cylinder, said solenoid valves being controlled by an electronic braking control unit, and a solenoid brake release valve adapted to cause, when energized, a complete discharge of the pneumatic braking pressure applied to said at least one brake cylinder, independently of the conditions of said solenoid charging and discharge valves;

the system comprising further an electric emergency line on which in normal operation there is a voltage which drops when emergency braking is activated.

Figure 1:
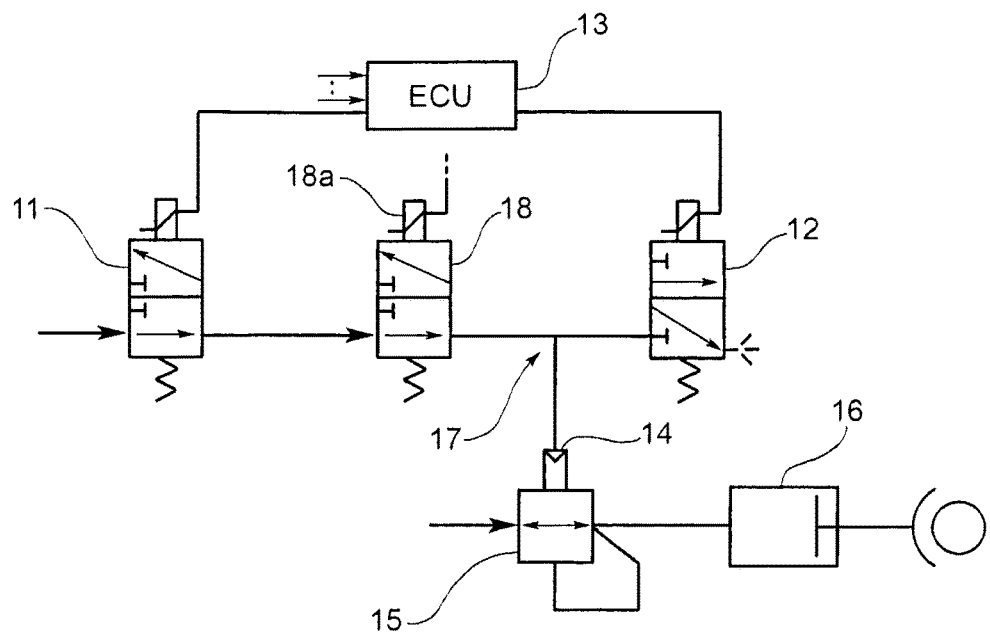
Figure 2:
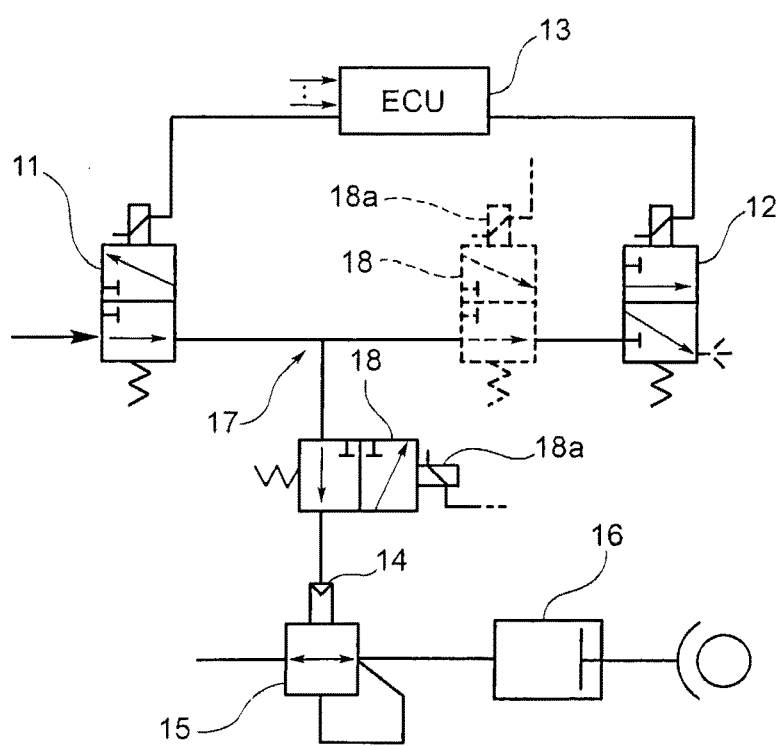

Various embodiments of a pneumatic braking system of the aforesaid type are schematically and partially illustrated in FIGS. 1 and 2 of the attached drawings.

In particular, in FIG. 1 the numbers 11 and 12 indicate the solenoid charging and discharge valves, also known as solenoid filling and emptying valves, controlled by an electronic unit (ECU) 13, for modulating the pressure in the control chamber 14 of a relay valve 15, the outlet of which is connected to a brake cylinder 16.

The solenoid valves 11 and 12 are of the three-way, two-position type, and in the de-energized state they are in the state shown in the drawing: the valve 11 allows a pressure to pass towards the control chamber 14 of the relay valve 15, and the valve 12 is closed.

In the diagram shown in FIG. 1, a further solenoid valve 18 is interposed between the solenoid valves 11 and 12, downstream of the branch 17 towards the relay valve 15, and causes, when energized, the total emptying of the control chamber 14 of the relay valve 15, regardless of the state of the solenoid valves 11 and 12, thereby causing the complete release of the brakes. The solenoid release valve 18, which may be controlled by an electronic control unit or by a command given by the driver who is driving the railway train, is also a three-way, two-position valve: in the de-energized condition, shown in FIG. 1, it allows the pneumatic pressure received from the solenoid valve 11 to pass towards the control chamber 14 of the relay valve 15. When energized, however, the valve 18 couples the control chamber 14 of the relay valve 15 to the atmosphere, thus allowing this chamber to be rapidly emptied.

FIG. 2 shows another diagram according to the prior art, illustrating two variants: in a first variant, the solenoid brake release valve 18 is shown in solid lines, and is interposed between the branch 17 and the control chamber 14 of the relay valve 15, while in the second variant the solenoid valve 18, shown in broken lines, is interposed between the branch 17 and the inlet of the solenoid discharge or emptying valve 12.

In other known arrangements, not shown, the pressure at the outlet of the charging valve 11 is sent to a brake cylinder without the use of a relay valve.

In the braking systems partially illustrated in FIGS. 1 and 2, the solenoid brake release valve 18 is energized as a result of a command given by the driver, or by an electronic control unit, in case it becomes necessary to disable the brake when the latter is jammed in the applied condition.

Regarding the prior art, it should also be noted that, depending on the specifications provided by the railway operators concerning the behaviour of the braking system, the electro-pneumatic valves 11 and 12 may be designed as follows:

in a configuration known as "direct", in which the valve 11, when de-energized, stops the inflow of pressurized air to the control chamber 14 of the relay valve, and the valve 12, when de-energized, empties this chamber 14 into the atmosphere, or in a configuration known as "inverse", in which the valve 11, when de-energized, allows the inflow of pressurized air to the control chamber 14 of the relay valve 15, and the valve 12, when de-energized, prevents the emptying of this control chamber into the atmosphere.

If the electronic control unit fails or is switched off, a "direct" configuration tends to empty the control chamber of the relay valve, thus causing the brake to be released, whereas an "inverse" configuration causes the brake to be applied with the maximum braking pressure.

In an "inverse" configuration, therefore, there is a risk that, before the driver and/or the electronic control unit of the vehicle can decide to release the brake relating to the failed or switched-off electronic unit, the braking system will overheat and become damaged, or the wheels will jam while the vehicle is moving at speed, thus creating what are known as "flattened areas" or "flats" on the wheels. In this situation it would be convenient and desirable to be able to cause the release of the brake automatically before one of the problems described above can arise.

In the arrangements according to the prior art described above, the release valve 18, when energized, is kept in this condition until the portion of the braking system affected by the failure has been fully isolated. This solution prevents the use of the isolated braking portion, even if the emergency brake is subsequently applied, and consequently increases the stopping distance.

Consequently a solution allowing the recovery of the braking functionality of the pneumatic circuit in an emergency braking condition, during which the electric emergency line or loop is disabled, would be highly innovative and useful.

One object of the present invention is therefore to provide a solution for overcoming the aforementioned drawbacks.

This and other objects are achieved according to the invention with a pneumatic braking system of the type defined above, characterized in that:

the aforesaid solenoid brake release valve is coupled to the aforesaid electric emergency line through at least one controlled electric switch, so that the solenoid brake release valve can be energized by a controlled closure of said switch when a voltage is present on said electric emergency line, and said solenoid brake release valve is de-energized when said switch is opened and when the voltage on the electric emergency line drops, independently of the condition of said switch.

Figure 3:
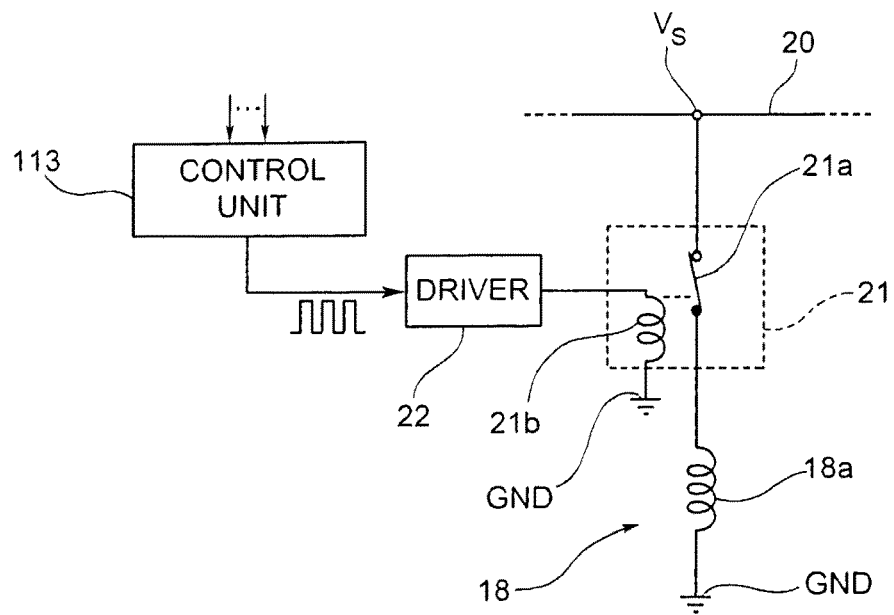
Figure 4:
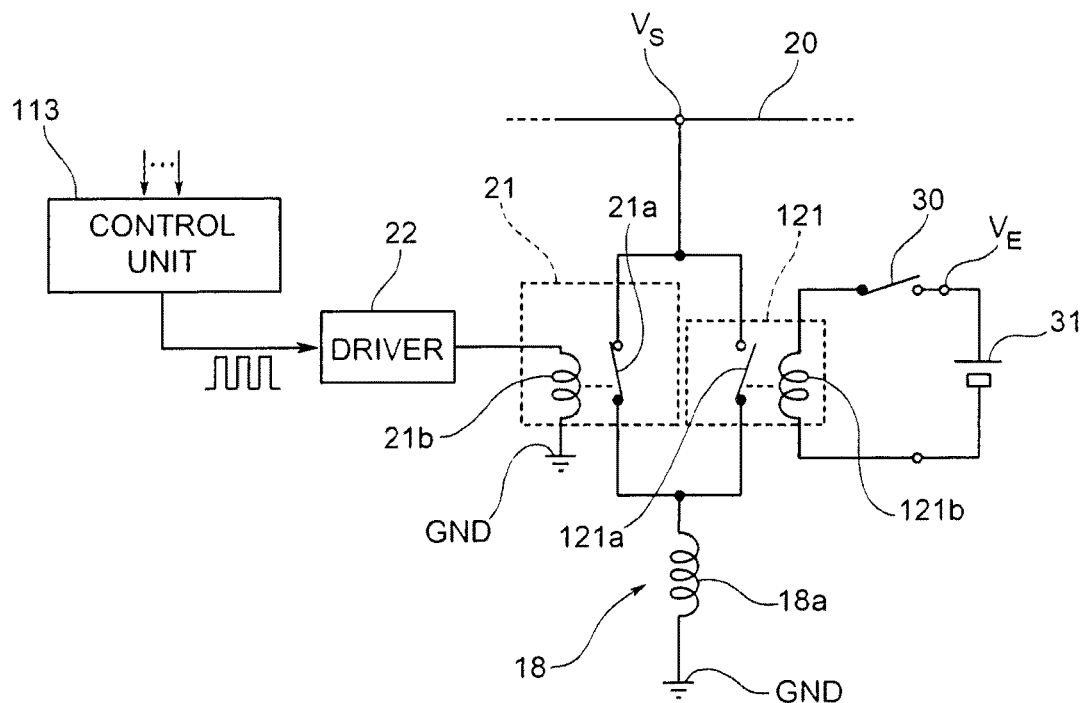

Further characteristics and advantages of the present invention will be apparent from the following detailed description, provided purely by way of non-limiting example, with reference to the attached drawings, in which:

FIGS. 1 and 2, described above, are diagrams partially illustrating pneumatic braking systems according to the prior art;

FIG. 3 is an electrical diagram, partially in block form, showing a first solution according to the present invention; and FIG. 4 is an electrical diagram, partially in block form, showing a second solution according to the present invention.

In FIG. 3, the number 18a indicates the control winding or solenoid of the solenoid brake release valve 18 of one of the diagrams shown in FIGS. 1 and 2.

In the solution according to FIG. 3, the winding or solenoid 18a has one terminal connected to an earth conductor GND and the other terminal connected to an electric emergency line or loop 20 on which, in a known way, during normal operation of the braking system of the railway vehicle, there is a voltage $V_S$, which drops when emergency braking is activated.

The winding or solenoid 18a of the solenoid brake release valve is coupled to the line or loop 20 through a controlled electric switch, indicated as a whole by 21.

The switch 21 is of the normally closed type, and in the embodiment shown by way of example in FIG. 3 it is an electromechanical switch, comprising a normally closed contact 21a controlled by a winding or solenoid 21b, the latter being connected between the outlet of a driver circuit 22 and the earth conductor GND. Evidently, the controlled switch 21 could alternatively be of a static type, for example a solid state electronic switch, controlled through a galvanic decoupling device such as an optical isolator.

When the braking system operates normally, a control unit 113 (which may or may not be the unit 13 described above) applies a vital signal to the input of the drive circuit or driver 22 such that said drive circuit 22 keeps the solenoid 21b energized, so that the latter holds the associated movable contact 21a in the open position, thereby keeping the winding or solenoid 18a of the solenoid brake release valve 18 de-energized. In this condition, with reference to the diagrams of FIGS. 1 and 2, the brake release valve 18 does not interfere with the normal operation of the braking system.

If an operating anomaly or a failure occurs, as detected by the control unit 113, it interrupts the application of the vital signal to the input of the drive circuit 22, which consequently deenergizes the winding or solenoid 21b of the controlled switch 21, whose movable contact 21a returns to the normal closed condition. The winding or solenoid 18a of the solenoid brake release valve 18 is then energized, and this solenoid valve 18 causes the immediate emptying of the control or drive chamber of the relay valve 15, thus fully releasing the brake and preventing any risk of locking.

The system remains in this state unless the emergency line or loop 20 is de-energized, in which case the solenoid 18a of the brake release valve 18 is then de-energized, returning the pneumatic braking system to the original condition.

This is found to be particularly favourable in the case of an "inverse" pneumatic configuration, since it restores the full braking force to the vehicle, including the portion relating to the electronic control unit in an anomalous or failed condition.

FIG. 4 shows a variant embodiment. In this drawing, parts and elements described previously have again been given the alphanumeric references used previously.

In the solution according to FIG. 4, the brake release valve 18 can be energized either as a result of the disappearance of the vital signal at the input of the drive circuit 22, or in consequence of a request activated by the driver or by a control logic of the vehicle, through a normally open switch 30, connected in a circuit which controls the energization of a second controlled switch device 121.

In the illustrated embodiment, the switch 121 is also of the electromechanical type, and comprises a normally open movable contact 121a connected in parallel to the normally closed contact 21a of the switch 21.

The switch 121 further comprises a winding or solenoid 121b which controls the position of the movable contact 121a, and which can be coupled via the switch 30 to a source 31 of an energizing voltage $V_E$.

The closure of the normally open switch 30, caused directly by the driver or by a control logic of the railway vehicle, causes the activation of the solenoid brake release valve 18: when the switch 30 closes, the winding or solenoid 121b of the switch 121 is energized and causes the closure of the movable contact 121a and the consequent energizing of the winding or solenoid 18a of the solenoid release valve 18.

In this case also, the control chamber 14 of the relay valve 15 is emptied virtually immediately, and the brake is released, preventing any risk of locking.

The system remains in this state unless the emergency line or loop 20 is de-energized, in which case the solenoid 18a of the brake release valve 18 is then de-energized, returning the pneumatic braking system to the original condition.

In other respects, the solution shown in FIG. 4 operates as described above in relation to the solution according to FIG. 3.

Naturally, the principle of the invention remaining the same, the forms of embodiment and the details of construction may be varied widely from what has been described and illustrated purely by way of non-limiting example, without thereby departing from the scope of the invention as defined by the attached claims.

The invention claimed is:

1. Pneumatic braking system for a railway vehicle, comprising a pneumatic circuit for supplying a pneumatic braking pressure to at least one brake cylinder, including
   a pneumatic solenoid charging valve and a pneumatic solenoid discharge valve adapted to cause an increase and a reduction, respectively, of the pneumatic pressure acting upon said at least one brake cylinder, said solenoid valves being controlled by an electronic braking control unit;
   a solenoid brake release valve adapted to cause, when energized, a complete discharge of the pneumatic pressure applied to said at least one brake cylinder, independently of the conditions of said solenoid charging and discharge valves; and
   the system comprising further an electric emergency line on which in normal operation there is a voltage which drops when emergency braking is activated;
   the system being characterized in that:
      said solenoid brake release valve is coupled to said electric emergency line through at least one controlled electric switch that is a normally closed type and is connected to control means designed to supply thereto a disabling signal, capable of keeping said switch open in a normal operating condition of the system and switching said disabling signal off and allowing the opening of said switch in a condition of malfunction or failure, so that the solenoid brake release valve can be energized by a controlled closure of said switch when a voltage is present on said electric emergency line; and
      the solenoid brake release valve is de-energized when said switch is opened, as well as when the voltage on the electric emergency line drops, independently of the condition of said switch.

2. Pneumatic braking system according to claim 1, wherein there is connected, in parallel with said at least one switch, at least one second controlled electric switch of a normally open type, adapted to be closed to cause the energization of said solenoid brake release valve as a consequence of the closure of an associated switch that can be controlled by a train driver and/or an electronic control system.

3. Pneumatic braking system for a railway vehicle, comprising a pneumatic circuit for supplying a pneumatic braking pressure to at least one brake cylinder, including
- a pneumatic solenoid charging valve and a pneumatic solenoid discharge valve adapted to cause an increase and a reduction, respectively, of the pneumatic pressure acting upon said at least one brake cylinder, said solenoid valves being controlled by an electronic braking control unit;
- a solenoid brake release valve adapted to cause, when energized, a complete discharge of the pneumatic pressure applied to said at least one brake cylinder, independently of the conditions of said solenoid charging and discharge valves; and the system comprising further an electric emergency line on which in normal operation there is a voltage which drops when emergency braking is activated;

the system being characterized in that:
- said solenoid brake release valve is coupled to said electric emergency line through at least one controlled electric switch, so that the solenoid brake release valve can be energized by a controlled closure of said switch when a voltage is present on said electric emergency line; and
- the solenoid brake release valve is de-energized when said switch is opened, as well as when the voltage on the electric emergency line drops, independently of the condition of said switch,
- wherein there is connected, in parallel with said at least one switch, at least one second controlled electric switch of a normally open type, adapted to be closed to cause the energization of said solenoid brake release valve as a consequence of the closure of an associated switch that can be controlled by a train driver and/or an electronic control system.

* * * * *

UNITED STATES PATENT AND TRADEMARK OFFICE
CERTIFICATE OF CORRECTION

PATENT NO. : 10,486,672 B2  
APPLICATION NO. : 15/746260  
DATED : November 26, 2019  
INVENTOR(S) : Roberto Tione and Andrea Cavazzin Page 1 of 1

It is certified that error appears in the above-identified patent and that said Letters Patent is hereby corrected as shown below:

Column 4, Line 59 In Claim 1, the phrase "allowing the opening" should be replaced with "allowing the closure."

Signed and Sealed this  
Twenty-sixth Day of May, 2020

Andrei Iancu  
*Director of the United States Patent and Trademark Office*